(12) United States Patent
Harty

(10) Patent No.: US 8,757,339 B2
(45) Date of Patent: Jun. 24, 2014

(54) CORD DISPENSING APPARATUS

(75) Inventor: Nanette C. Harty, Holly Hill, FL (US)

(73) Assignee: Shebuilt, LLC, Miami, FL (US)

( * ) Notice: Subject to any disclaimer, the term of this patent is extended or adjusted under 35 U.S.C. 154(b) by 98 days.

(21) Appl. No.: 13/228,987

(22) Filed: Sep. 9, 2011

(65) Prior Publication Data

US 2012/0061503 A1    Mar. 15, 2012

Related U.S. Application Data

(60) Provisional application No. 61/381,334, filed on Sep. 9, 2010.

(51) Int. Cl.
*H02G 11/02* (2006.01)
*H02G 11/00* (2006.01)
*B65H 75/48* (2006.01)

(52) U.S. Cl.
USPC .................................. 191/12 R; 191/12.2 R

(58) Field of Classification Search
USPC ....... 191/12 R, 12.2 R, 12.4, 12.2 A; 174/53; 439/4, 501; 242/372; 200/61.13
See application file for complete search history.

(56) References Cited

U.S. PATENT DOCUMENTS

| | | | |
|---|---|---|---|
| 1,384,153 A * | 7/1921 | Roos | 242/388.91 |
| 5,701,981 A | 12/1997 | Marshall et al. | |
| 5,773,757 A | 6/1998 | Kenney et al. | |
| 6,179,238 B1 * | 1/2001 | Phillipps | 242/378.4 |
| 6,648,677 B1 * | 11/2003 | Boyd | 439/501 |
| 7,309,834 B1 | 12/2007 | Byrd | |
| 2005/0039997 A1 * | 2/2005 | Mackin et al. | 191/12.2 R |
| 2007/0159772 A1 | 7/2007 | Morice | |
| 2009/0090589 A1 | 4/2009 | Matthew et al. | |
| 2009/0156053 A1 | 6/2009 | Hwang et al. | |
| 2010/0059268 A1 | 3/2010 | St.Clair | |
| 2010/0102775 A1 | 4/2010 | Chander et al. | |

\* cited by examiner

*Primary Examiner* — Mark Le
(74) *Attorney, Agent, or Firm* — JP Webb; Jason P. Webb; Danny Y. H. Cheng

(57) ABSTRACT

A cord dispensing apparatus configured to dispense a length of cord including an L-shaped housing. The apparatus includes a first spool and a second spool disposed within a pair of guide channels within the housing. At least one of the first spool and the second spool includes a central shaft and a free spinning exterior surface, wherein the exterior surface of one of the spools is configured to freely rotate. The apparatus includes a bias member coupled to the first spool and positioned and oriented such that the bias member resists displacement of the first spool in the direction of the second spool. The apparatus includes a cord wound between both the first spool and the second spool, wherein a head of the cord extends outside of the housing. The apparatus includes a mounting structure coupled to the housing and configured to mount the housing to a surface.

13 Claims, 6 Drawing Sheets

CORD DISPENSING APPARATUS

CROSS-REFERENCE TO RELATED APPLICATIONS

This invention claims priority, under 35 U.S.C. §120, to the U.S. Provisional Patent Application No. 61/381,334 to Nanette Harty filed on Sep. 9, 2010, which is incorporated by reference herein in its entirety.

BACKGROUND OF THE INVENTION

1. Field of the Invention

The present invention relates to electrical sockets, specifically to an electrical cord dispensing apparatus.

2. Description of the Related Art

AC power plugs and sockets are devices for removably connecting electrically operated devices to the power supply. A plug connects to a matching socket. Plugs are mostly or completely male, while sockets are mostly or completely female; the plug has protruding prongs or pins that fit into matching slots or holes in the socket. Generally the plug is the movable connector attached to an electrically-operated device's power cord, and the socket is a fixture on equipment or a building structure. Wall-mounted sockets are also called receptacles, outlets, or power points. To reduce the risk of electric shock, plug and socket systems can incorporate a variety of safety features.

An extension cord, power extender, or extension lead is a length of flexible electrical power cable with a plug on one end and one or more sockets on the other end (usually of the same type as the plug). The term usually refers to mains (household AC) extensions but is also used to refer to extensions for other types of cabling. If the plug and receptacle are of different types, the term "adapter cord" may be used. Extension cable is also used, but that has a distinct meaning from extension cord for many people. Some improvements have been made in the field. Examples of references related to the present invention are described below in their own words, and the supporting teachings of each reference are incorporated by reference herein:

U.S. Pat. No. 5,701,981, issued to Marshall et al., discloses a retractable and extendable electrical cord, for positioning in a wall and having a hollow housing, one or more reels rotatably mounted within the hollow housing, an electrical cord wound upon each reel, a retraction spring connected to each reel for rewinding the reel to retract the cord, first and second electrical contact members mounted on the reel in spaced apart relation, and ends of the electrical cord being connected to the contacts of said reel, first and second contact rings mounted within the housing and engageable by respective first and second electrical contacts, as the reel rotates, and electrical supply connections connected to the first and second contact rings. Also disclosed is a portable electrical cord extension and retraction device which can be plugged in to a conventional wall socket so that the cord can be extended to reach an appliance, and can be retracted when not required.

U.S. Pat. No. 7,309,834, issued to Byrd, discloses an extendible and retractable electrical extension cord device is disclosed, which includes a housing adapted to be secured to a wall of a structure, and a reel mounted in the housing for rotation. An extension cord is wound about the reel, and has a first plug end in the housing and a second plug end extending outwardly through the housing and winding relative to the reel upon rotation thereof in a first direction, and unwinding relative to the reel upon rotation thereof in a second direction. An electric-powered drive assembly is mounted in the housing and is movable between an active condition rotating the reel in the first direction and an inactive condition permitting the reel to rotate freely in at least the second direction.

U.S. Pat. No. 5,773,757, issued to Kenney et al., discloses a retractable electric power cord apparatus of the present invention can be mounted within a wall space between a pair of vertical studs forming a wall. The retractable cord apparatus includes a frame sized to be positioned and attached within the wall space by way of an opening formed in the wall, a door pivotally connected to the frame and an electric power cord. A spool for extending and retracting the electric power cord is connected to an inside of the door such that the spool has an axis of rotation perpendicular to the door and is sized to fit within the frame.

U.S. Patent Application Publication No.: 2010/0059268, by St. Clair, discloses an apparatus for assembling over a standard electrical wall outlet for providing a handy and neatly stored retractable extension cord disposed in such apparatus. Such apparatus further includes a regular outlet disposed on a cover portion of the apparatus. Such apparatus mounts closely adjacent such standard wall outlet. The retractable extension cord assembly has a twist lock receptacle that can be used with compatible electrical devices.

U.S. Patent Application Publication No.: 2007/0159772, by Morice, discloses The present invention is a power outlet device, attachable to an IV pole, that receives electrical power from a wall socket through an electrical cord and provides at least one electrical outlet with electrical power to be used to power devices used in hospital or clinical medical settings. The electrical cord becomes the sole cord necessary for providing electrical connectivity to the wall source. The power outlet device of the present invention is preferably provided in a compact housing that is easily mounted on the IV pole. On the face of the housing are preferably multiple electrical outlets that are used for each piece of portable electrical equipment that is mounted on the same IV pole. The power outlet is attachable to an IV pole through either hanging from a hook on the IV pole or by being clamped to the IV pole. The preferred embodiments of the invention have an electrical cord that is retractable into the housing of the device. The device preferably includes at least one circuit breaker in the electrical line. The power outlet of the present invention is preferably a re-usable piece of equipment that can be cleaned between patient uses according to a hospital's standard policy. Each IV pole has the potential of using several power outlets of the present invention (e.g. between 1-5) per pole, depending on the functionality of the IV pole. The invention also preferably includes a light source and a control switch to control the light source.

The inventions heretofore known suffer from a number of disadvantages which include being limited in use, being limited in length, being limited in retractability, being expensive, being complex, being difficult to install, being cumbersome to use, being dirty, being inconvenient, being slow in use or operation, causing a fire hazard, being dangerous, and/or being difficult to use.

What is needed is a cord dispensing apparatus that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available electrical sockets and extension cords. Accordingly, the present invention has been developed to provide a cord dispensing apparatus to extend and retract from an electrical wall socket.

According to one embodiment of the invention, there is a cord dispensing apparatus that may be configured to dispense a length of cord. The apparatus may include a housing. The housing may be L-shaped in configuration. The apparatus may include a first spool that may be disposed within the housing. The apparatus may include a second spool that may be disposed within the housing and may be spaced from the first spool. The first spool and the second spool may be coupled to a pair of guide channels, meaning, the first spool is coupled to a pair of guide channels having bias members disposed therein. At least one of the first spool and the second spool may include a central shaft and a free spinning exterior surface. The exterior surface of one of the spools may be configured to freely rotate.

The cord dispensing apparatus may include a bias member that may be coupled to the first spool and may be positioned and oriented such that the bias member may resist displacement of the first spool in the direction of the second spool. The bias member may be positioned between the first spool and the second spool. The bias member may be a spring. The apparatus may include a cord that may be wound between both the first spool and the second spool in a plurality of cross-spool windings, wherein a head of the cord may extend outside of the housing.

The cord dispensing apparatus may include a mounting structure that may be coupled to the housing and may be configured to mount the housing to a surface. The apparatus may include a connection region of the housing that may include a tail portion of the cord and configured to receive a connection to the cord. The apparatus may include a ratchet mechanism that may be configured to selectably restrict re-entry of the cord into the housing. The apparatus may include a face plate that may include an oversized aperture such that when the head of the cord is disposed therethough sufficient access space may be available to reach in and grasp the head.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
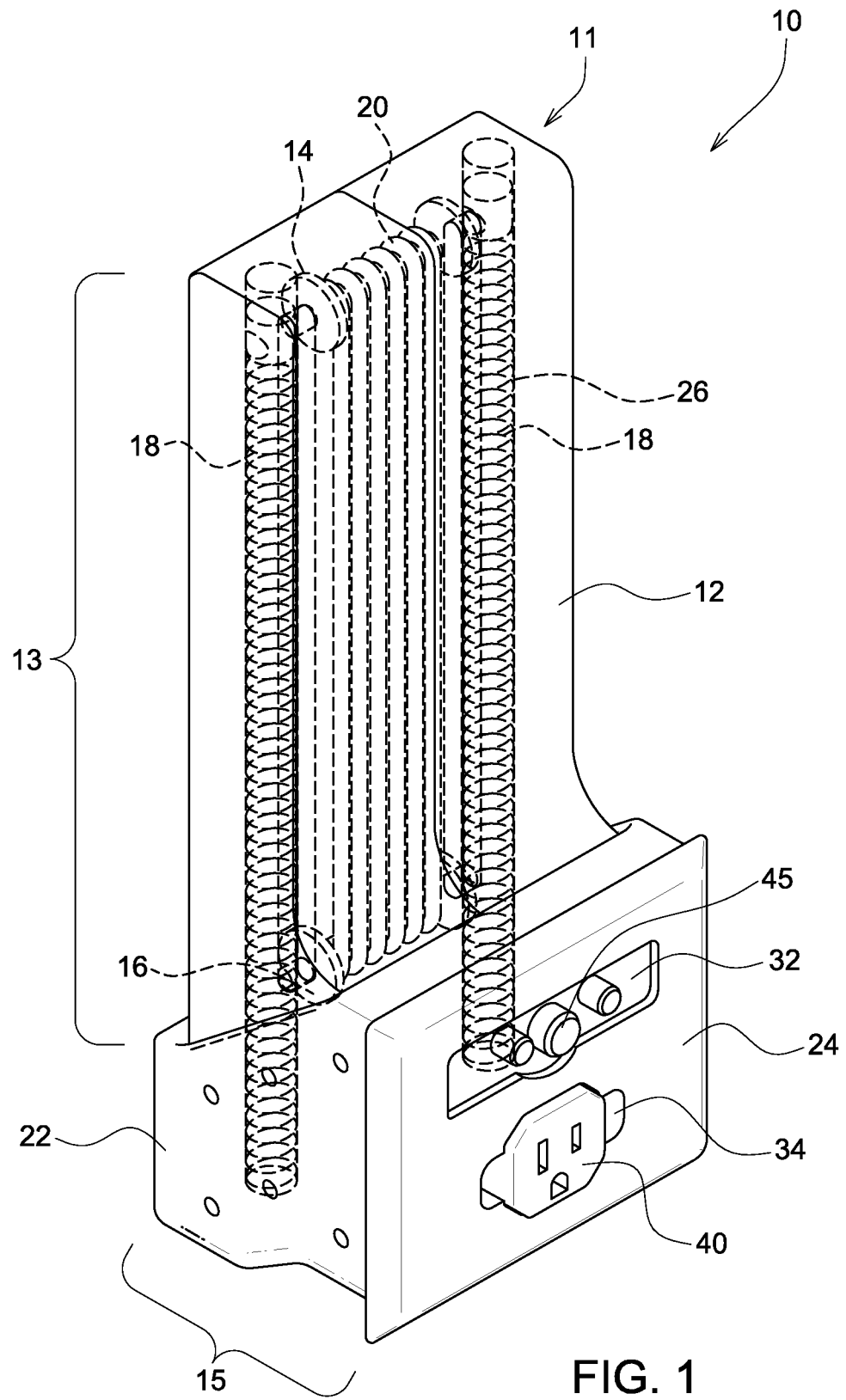
FIG. 1 is a front perspective view of a cord dispensing apparatus, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising"

is to be interpreted as including the more restrictive terms "consisting of" and "consisting essentially of."

FIG. 1 is a front perspective view of a cord dispensing apparatus ("pod"), according to one embodiment of the invention. There is shown a cord dispensing apparatus 10 including a housing 12, a top portion 11, an elongated body 13, and a footing 15, having disposed therein: a cord 20 wound about a first spool 14 and a second spool 16, with a bias member 18 functionally disposed between the spools in a guide channel 26. The housing is coupled to a mounting structure 22, having a faceplate 24 and a footing 15. The cord 20 extends out through the faceplate 24, wherein the head thereof is visible and accessible to a user outside the apparatus 10 by inserting fingers into available space in an oversized aperture, such space not taken up by the head of the cord 20. Accordingly, a user may retract the cord 20 from the apparatus, causing the spools to come closer together, thereby reducing the effective storage capacity of the apparatus, while the bias member 18 effects a restoration of the original storage capacity of the apparatus once the cord is released and permitted to retract.

The illustrated cord dispensing apparatus 10 is configured to dispense a length of cord 20. The apparatus 10 includes an L-shaped housing 12, which includes a top portion 11, and elongated body 13, and a footing 15, configured to be disposed within a wall or structure to provide an electrical outlet thereto. The apparatus 10 includes a first spool 14 disposed within the L-shaped housing 12. The first spool 14 is positioned at a top portion 11 of the housing 12. The apparatus 10 includes a second spool 16 disposed parallel to the first spool 14. The second spool 16 is positioned at a bottom portion of the housing 12 and spaced vertically from the first spool 14. The first spool 14 includes guide members flanking the spool and coupled thereto. The guide members are coupled to a pair of guide channels 26 and in functional contact with the bias members 18. The second spool 16 is aligned with the guide channels 26 and fixedly coupled to the housing such that it may not be displaced during normal operation, such as but not limited to by soldering, welding, glue, friction fitting, being fitted into a socket, and the like and combinations thereof.

The illustrated guide channels 26 are configured to restrict horizontal displacement of the first spool 14, while permitting vertical motion along the main axis of the pair of guide channels 26. The guide channels 26 are disposed along the elongated body and footing 15 of the housing 12. The first spool 14 and the second spool 16 are configured to support a cord 20 wound there between, thereby creating a plurality of cross-spool windings, each winding of the cord having an effective wind-length of about the distance between the spools. Accordingly a length of cord that may be stored thereon is approximately equal to the product of the distance between the spools and double the number of windings. Therefore, altering a distance between the spools and/or the number of windings may alter the effective storage capacity. Such may be altered during manufacture/design and/or may be altered during use.

The illustrated cord dispensing apparatus 10 includes a bias member 18 coupled to the first spool 14. A bias member 18 may include but is not limited to a spring or other device or structure that is elastically deformable or otherwise capable of permitting displacement under force and causing displacement to an original location when the force is removed. The illustrated bias member 18 is positioned and oriented such that the bias member 18 resists displacement of the first spool 14 in the direction of the second spool 16. The illustrated bias member is positioned in the guide channel 26 and configured such that the first spool 14 has a natural (unbiased) position near a top of the guide channel 26 and wherein force is required to displace the first spool 14 in a downward direction, closer to the second spool. In another non-limiting example, a bias member may be disposed in a location that is not between the two spools and may "pull" the first spool away from the second spool under force, instead of "pushing" the first spool away as in the illustrated example. A bias member 18 may be functionally coupled to a spool and/or portion thereof. There may be a plurality of bias members that may act in concert, such as but not limited to a spring in each guide channel. The illustrated bias member 18 is positioned between the first spool 14 and the second spool 16 about one of, or both of the pair of guide channels 26. The illustrated bias member 18 is a spring. A bias member 18 may be functionally coupled to a second spool 16.

The illustrated cord 20 includes a head 40 extending outside of the housing 12 footing 15 configured to extend out from the housing 12 footing 15 and provide an electrical connection away from the housing 12; wherein the head 40 of the cord 20 is extended out from the housing 12 footing 15, the first spool 14 is compressed downwardly towards the second spool 16. The cord 20 includes a root/tail portion that may couple to a connection region of the housing, such as but not limited to wherein exposed wires of the tail portion of the cord are spliced, soldered, glued, wrapped, twined, or otherwise coupled to electrical leads that are functionally coupled to mating members on an exterior of the housing. A tail portion of a cord may be fixedly coupled to one or more of the housing, first spool, second spool, connection region, or the like or combinations thereof such that the coupling of the tail region to the mating member/etc. is not disturbed or put under stress or strain during normal use.

The illustrated cord dispensing apparatus 10 includes a mounting structure 22 coupled to the housing 12 and configured to mount the housing 12 to a surface, such as a wall. The illustrated mounting structure 22 is configured to couple to a bottom portion of the housing 12 and guide the housing 12 into the wall and position the housing 12 flush against the surface or wall. The mounting structure may include a structure or profile similar to a standard double plug outlet, thereby being retrofitted for standard electrical sockets or outlets.

The illustrated apparatus 10 includes a ratchet mechanism 32 in communication with the cord 20 and configured to selectably restrict re-entry of the cord 20 into the footing 5 housing 12 when extending out therefrom. The illustrated ratchet mechanism 32 includes a recoil device 45, wherein upon activation of the recoil device 45, the bias member 18 functionally releases the first spool 14, and the first spool 14 is permitted to return in a direction towards a top portion of the housing 12. A ratcheting mechanism 32 may be coupled about the cord 20 and/or in communication (direct or indirect) with one or more of the first spool, second spool, or bias member, such that in one mode, the ratcheting member permits motion thereof in one direction only and in another mode permits motion in more than one direction. There may be a mode where no motion is permitted. Such may be effectuated by a wheel friction coupled to a cord near an exit aperture of the housing, wherein the wheel includes a ratcheting structure such as but not limited to an asymmetrical saw-tooth interior wheel that engages a biased protrusion that may be selectably disengaged from the saw-toothed interior wheel by application of a lever, button, spring, switch, and/or the like or combinations thereof. Similar structures and/or devices may be selectably engaged to one or more of the spools, guide channels, bias members, and the like and combinations thereof.

The illustrated apparatus 10 includes a face plate 24 including an oversized aperture 34 such that when the head 40 of the cord 20 is disposed therethough sufficient access space is available to reach in and grasp the head 40 of the cord 20. Such a faceplate may be sized to cover an aperture through a wall and may provide decorative and/or protective structure.

In one embodiment, there is an in-wall housed retractable electrical extension cord that self-winds and may have a built in surge protector (such as but not limited to surge protection devices described in U.S. Pat. No. 5,272,588 and US Patent Publication No.: 2006/0007625 which are incorporated herein for their supporting teachings and/or surge protection features of the following products: Belkin Home/Office Surge Protector manufactured by Belkin International, Inc. 12045 E. Waterfront Drive, Playa Vista, Calif., 90094; or a APC SurgeArrest Preformance Surge Suppressor manufactured by American Power Conversion, 132 Fairgrounds Road, W. Kingston, R.I., 02892 which may fit in a standard two-by-four wall construction. Such may come in two selectably coupleable pieces: a receiving box and a pod.

A receiving box may be shaped to receive a pod therein and may be hard wired to the building itself (such as but not limited to the same manner that existing electrical boxes are functionally coupled to an interior of a wall of a building), the top and/or front of which may include an aperture to allow for the pod to enter through the face of the receiving box and move up inside the wall. A receiving box may be shaped like a standard electrical box, but be open in a top/rear portion to permit access therethrough of a pod. A functional mating structure/device/surface may be disposed on a bottom/rear/side interior of the box, thereby being accessible to an inserted pod.

A pod may plug into the receiving box itself and/or may contain an extension cord that functionally couples to the receiving box as the pod slides into place therein, making an electrical contact (or other functional contact in the case of non-electrical cords, such as but not limited to fiber-optic and the like). The pod may be removable and/or replaceable to deal with wear and tear over the years. In one embodiment, there are no exposed wires, even when the pod is removed because the pod includes a functional coupling unit that functionally couples to the cord (similar to the outlet coupling that occurs in a standard outlet box) and includes a functional mating member that functionally couples to a mating device/surface of the receiving box, thereby forming a connection without any exposed wires. Such a functional mating may be through male-female plugs/sockets such as but not limited to those found in extension cords, computer cards and motherboards, and the like and combinations thereof. A pod may be housed in a smooth plastic allowing for no accidental shocks. In one embodiment, electrical current only functionally connects with the pod once it has clicked into place with the receiving box. A faceplate may be part of a pod, and such may be a single formed unit. In one embodiment, looking to the front, a faceplate may appear similar in size to one or more standard outlets on the market today.

An extension cord housed in a pod may come in various lengths depending upon need, including but not limited to: 8, 10 and 12 feet lengths. In operation a user may push the face of the outlet (and/or a trigger point or button thereon) to release the cord, pulls the desired length of cord out of the wall. The cord may wind back into the wall, out of sight, once a user hits a rewind button on the face plate, or otherwise triggers a retraction of the cord.

Figure 2:
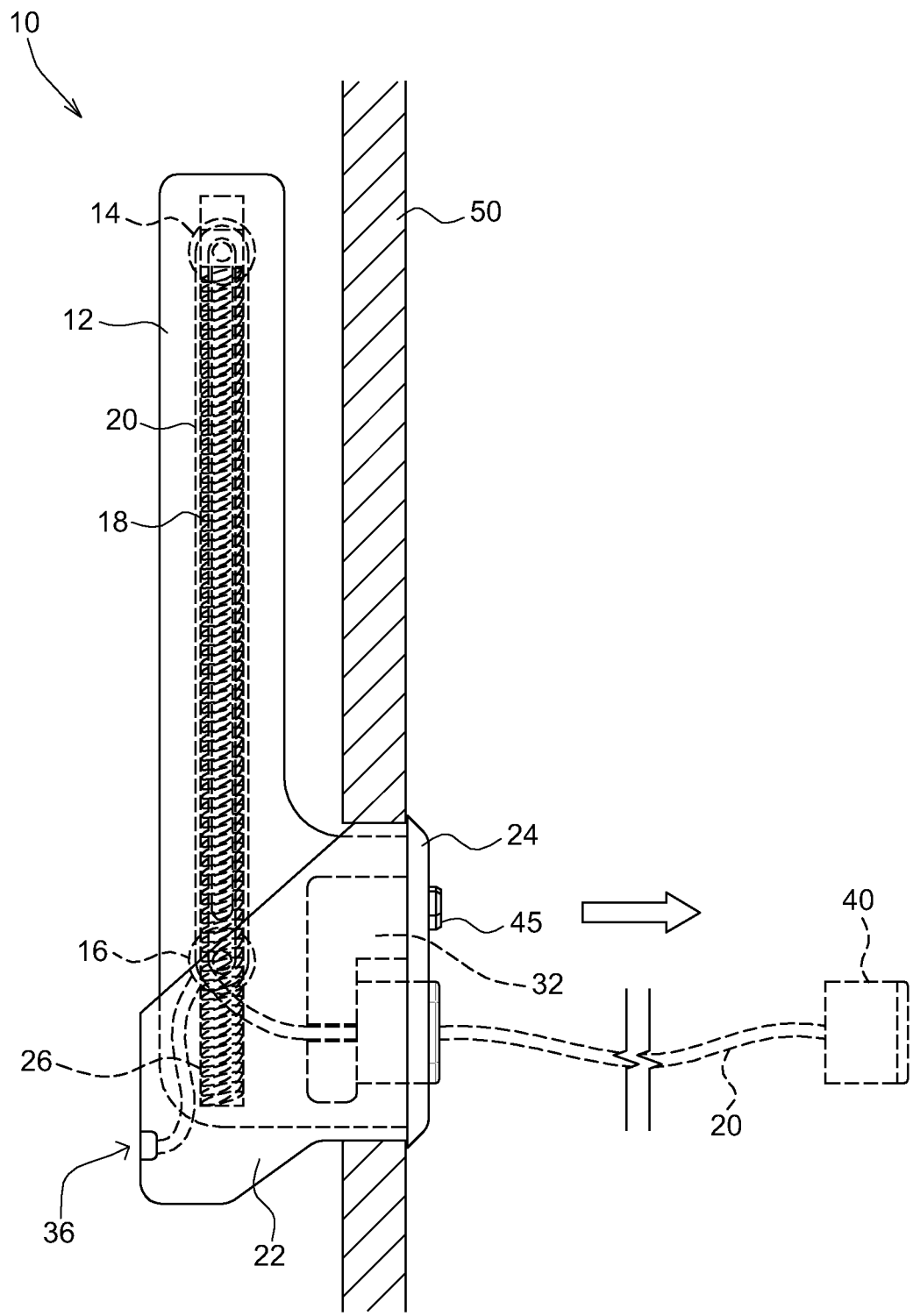
FIG. 2 is a side elevational view of a cord dispensing apparatus coupled to a wall, according to one embodiment of the invention.

FIG. 2 is a side elevational view of a cord dispensing apparatus coupled to a wall, according to one embodiment of the invention. There is shown a cord dispensing apparatus 10 including an L-shaped housing 12, a first spool 14, a second spool 16, a pair of guide members 26, a faceplate 24, a ratchet mechanism 32, and a cord 20, the housing coupled (directly or indirectly) to a wall 50, such as but not limited to a sheet of drywall, plywood, metal, or the like or combinations thereof.

The illustrated cord dispensing apparatus 10 is configured to be disposed within a wall 50 mounted flush along a surface. The apparatus 10 is configured to selectably dispense a length of cord 20. The apparatus 10 includes an L-shaped housing 12 configured to be disposed upright within a wall or structure to provide an electrical outlet thereto. The cord dispensing apparatus 10 includes a mounting structure 22 disposed on a bottom portion of the L-shaped housing 12. The mounting structure is configured to mount the housing 12 to a surface, such as a surface of a wall 50.

The apparatus 10 includes a ratchet mechanism 32 in communication with a length of cord 20 and configured to selectably restrict re-entry of the cord 20 into the housing 12 when extended out therefrom. The ratchet mechanism 32 includes a recoil device 45, wherein upon activation of the recoil device 45, the head 40 of the cord 20 is retracted into the housing 12. In one non-limiting embodiment, the ratchet mechanism may include a spring-loaded rotatable pincer having an angled shape that is in contact with the cord through an aperture such that when the cord is pulled in one direction, the cord is slides along an angled surface of the pincer but in the other direction it engages with a "point" of the pincer (not necessarily sharp) that causes the pincer to rotate into the cord, thereby applying additional force and friction against the cord and substantially restricting such directional motion of the cord. The recoil device may include a spring-loaded button that when pressed engages with the pincer, such as by pressing on a lever coupled thereto such that the pincer is displaced away from the cord. In another non-limiting embodiment, such a structure may resemble mechanisms found in measuring tape dispensers, such as but not limited to those described in U.S. Pat. No. 4,827,622, or U.S. Pat. No. 6,226,886, or U.S. Pat. No. 7,454,845, the supporting teaching of which are incorporated by reference herein.

The apparatus 10 includes a first spool 14 disposed within the L-shaped housing 12. The apparatus 10 includes a second spool 16 disposed horizontally parallel to the first spool 14. The second spool 16 is positioned and spaced vertically from the first spool 14. The first spool 14 and the second spool 16 are coupled to a pair of guide channels 26 and configured to restrict horizontal displacement of the first spool 14, while moving up and down between the pair of guide channels 26. The pair of guide channels 26 are configured to be disposed along a vertical length of the housing 12. The first spool 14 and the second spool 16 are configured to support a cord 20 wound there between. The cord dispensing apparatus 10 includes a bias member 18 coupled to the first spool 14. The bias member 18 is positioned and oriented such that the bias member 18 resists displacement of the first spool 14 in the direction of the second spool 16. The illustrated cord 20 includes a head 40 extending outside of the housing 12 configured to extend out from the housing 12 and provide an electrical connection away from the housing 12. The apparatus 10 includes a connection region 36 of the housing 12 including a tail portion of the cord 20 and configured to receive a connection to the cord 20.

In operation of one embodiment of the invention, there is a socket aperture disposed on a surface of a wall. A user displaces a mounting structure within the socket aperture and disposes a face of the mounting structure flush along the surface of the wall. The user connects the cord dispensing apparatus to an electrical connection. The user disposes a top portion of an L-shaped housing of the cord dispensing apparatus through the mounting structure and up along the wall.

The user mounts the housing to the mounting structure and attaches a faceplate thereto. The faceplate may be integral to the housing or may be selectably coupleable thereto, such as but not limited to by the cooperative use of screws, apertures and threaded apertures. The illustrated faceplate extends an amount beyond the housing, thereby covering the hole in the wall through which the housing is disposed.

In operation, the user disposes his/her fingers into an oversized aperture of the faceplate and pulls out the head of the cord. The user extends the cord out in the direction shown by the arrow to a desired length and couples an electrical device thereto. The ratcheting mechanism prevents the cord from retracting, despite force applied by the bias member. Upon completion of use, the user engages a recoil device and the head of the cord automatically retracts back within the housing, through force applied by the bias member in cooperation with the spools and windings. Spools may include one or more characteristics or structures that reduce friction between the spools and the cord during extension and/or retraction, such as but not limited to being freely rotatable, having a reduced friction coating (oil, plastic, high degree of polishing, material that does not engage with an exterior surface of the cord, and the like and combinations thereof).

Figure 3:
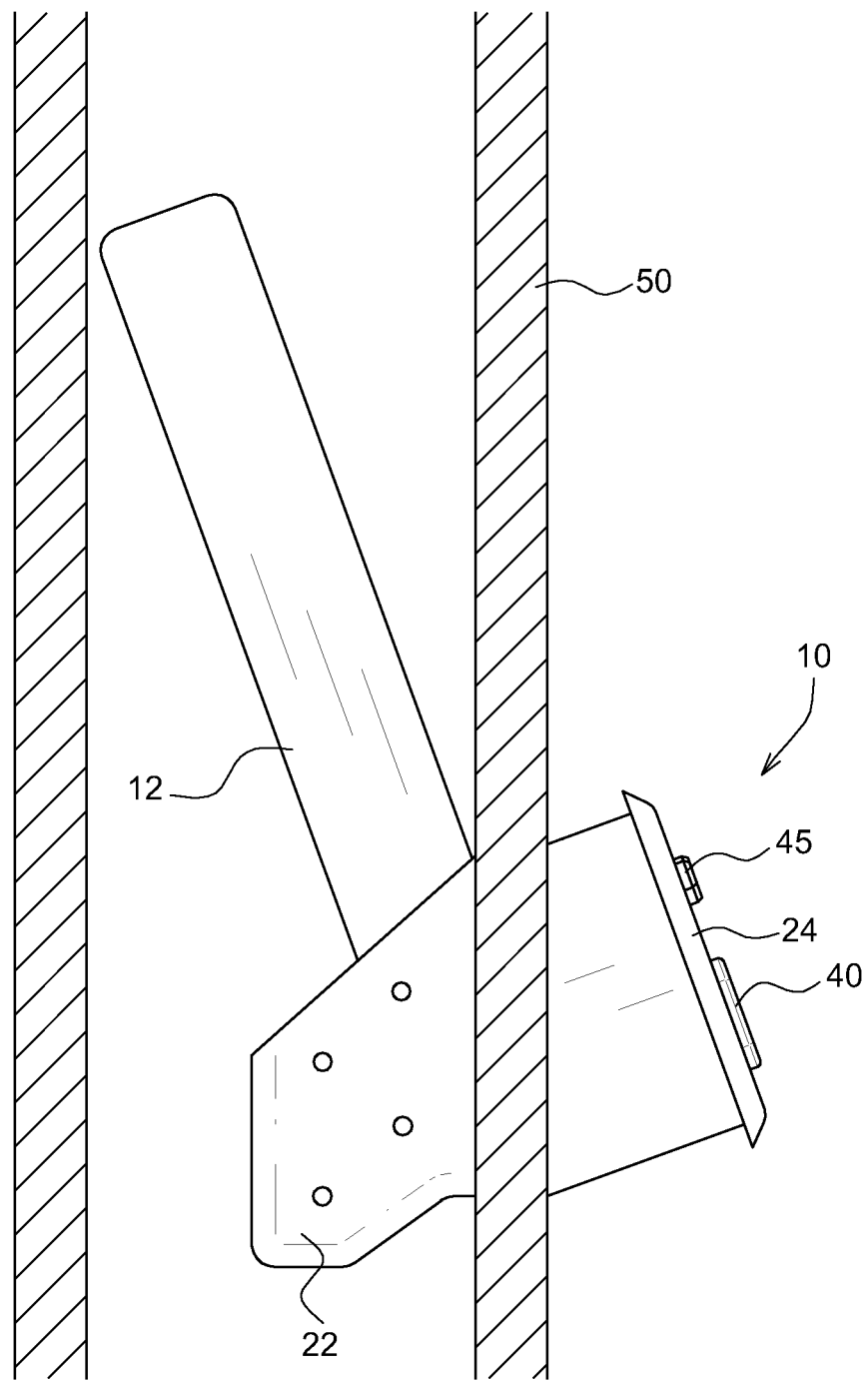
FIG. 3 is a side elevational view of a cord dispensing apparatus being installed into a wall, according to one embodiment of the invention.

FIG. 3 is a side elevational view of a cord dispensing apparatus being installed into a wall, according to one embodiment of the invention. There is shown a cord dispensing apparatus 10 including an L-shaped housing 12, a mounting structure 22, a faceplate 24, and a head 40 of a cord.

The illustrated cord dispensing apparatus 10 is configured to dispense a length of cord 20. The apparatus 10 includes an L-shaped housing 12 configured to be disposed within a wall 50 or structure to provide an electrical outlet thereto. The L-shaped housing 12 includes a cord disposed therein. The cord 20 includes a head 40 extending outside of the housing 12 configured to extend out from the housing 12 and provide an electrical connection away from the housing 12. The cord dispensing apparatus 10 includes a mounting structure 22 coupled to the housing 12 and configured to mount the housing 12 to a surface, such as a wall 50. The L-shaped housing 12 and the mounting structure 22 are configured to enable the L-shaped housing to slide up into a wall or structure without having the need to create a bigger socket aperture or reconfigure a new aperture on an existing wall or structure. The L-shaped housing 12 is configured to dispose a top portion of the housing 12 into the socket aperture and pivotally position the faceplate of the housing flush along the surface of the wall or structure.

Figure 4:
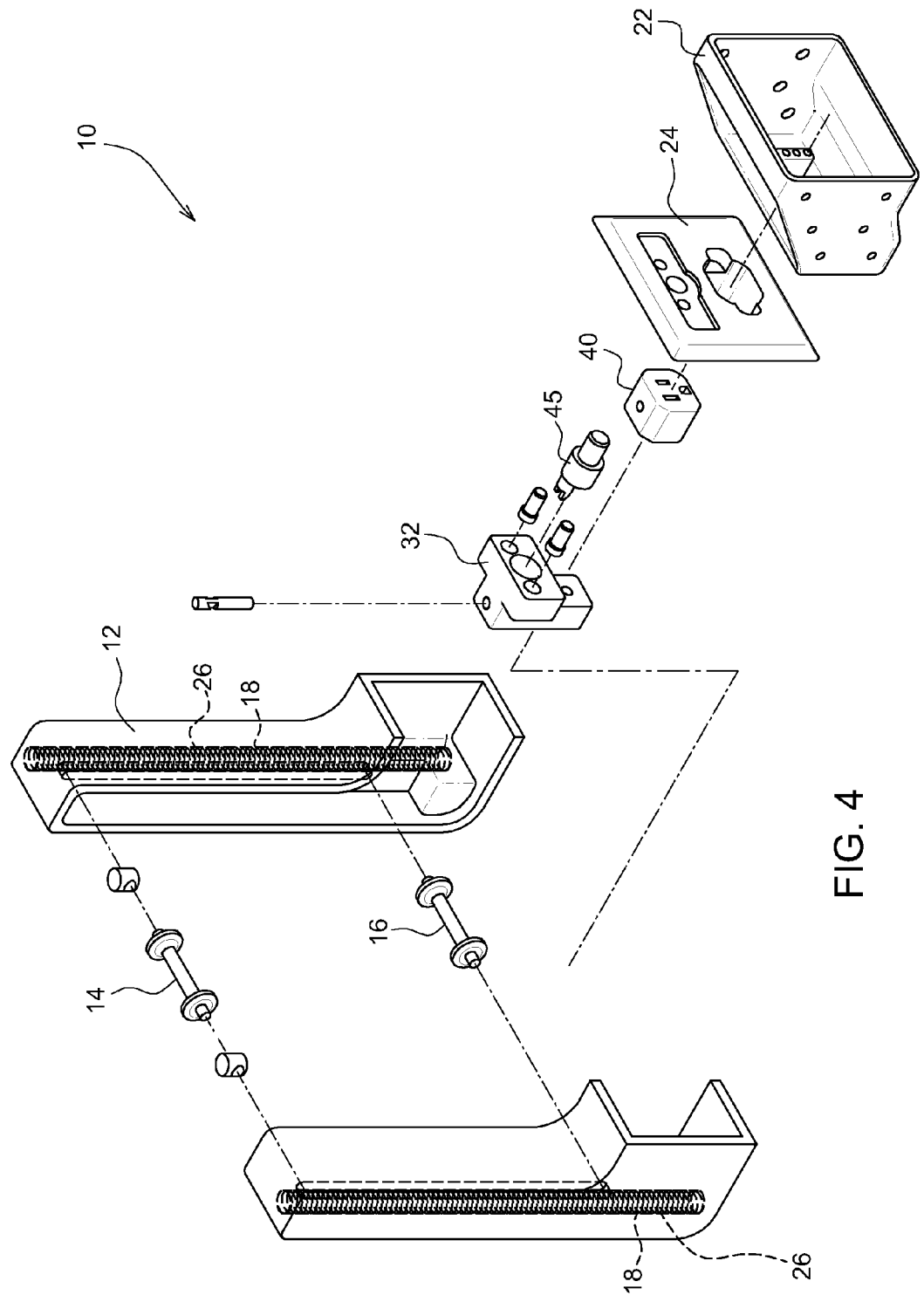
FIG. 4 is an exploded view of a cord dispensing apparatus, according to one embodiment of the invention.

FIG. 4 is an exploded view of a cord dispensing apparatus, according to one embodiment of the invention. There is shown a cord dispensing apparatus 10 including a first spool 14, a second spool 16, a pair of guide members 26, a ratchet mechanism 32, a cord head 40, a faceplate 24, and a mounting structure 22.

The illustrated cord dispensing apparatus 10 is configured to dispense a length of cord 20. The apparatus 10 includes an L-shaped housing 12 configured to be disposed within a wall or structure to provide an electrical outlet thereto. The apparatus 10 includes a first spool 14 and a second spool 16 disposed within the L-shaped housing 12. The first spool 14 is positioned at a top portion of the housing 12 and the second spool is disposed about a bottom portion of the housing 12. The second spool 16 is disposed parallel to the first spool 14 and positionally spaced from the first spool 14. The first spool 14 and the second spool 16 are coupled to a pair of guide channels 26.

The pair of guide channels 26 are configured to restrict horizontal displacement of the first spool 14, while moving vertically up and down between the pair of guide channels 26. The pair of guide channels 26 are configured to be disposed along a vertical length of the L-shaped housing 12 and configured to provide a track for the first spool 14 to move thereon. The first spool 14 and the second spool 16 are configured to support a cord 20 wound there between, thereby creating a plurality of cross-spool windings. The cord dispensing apparatus 10 includes a bias member 18 coupled to the first spool 14. The bias member 18 is positioned and oriented such that the bias member 18 resists displacement of the first spool 14 in the direction of the second spool 16. The bias member 18 is positioned between the first spool 14 and the second spool 16 about one of, or both of the pair of guide channels 26. The cord 20 includes a head 40 extending outside of the housing 12 configured to extend out from the housing 12 and provide an electrical connection away from the housing 12; wherein the head 40 of the cord 20 is extended out from the housing 12, the first spool 14 is compressed downwardly towards the second spool 16.

The cord dispensing apparatus 10 includes a mounting structure 22 coupled to the housing 12 and configured to mount the housing 12 to a surface, such as a wall. The mounting structure 22 is configured to couple to a bottom portion of the housing 12 and guide the housing 12 into the wall and position the housing 12 flush against the surface or wall. The mounting structure may include a structure or profile similar to the a standard double plug outlet, thereby being retrofitted for standard electrical sockets or outlets. The apparatus 10 includes a ratchet mechanism 32 in communication with the cord 20 and configured to selectably restrict re-entry of the cord 20 into the housing 12 when extending out therefrom. The ratchet mechanism 32 includes a recoil device 45, wherein upon activation of the recoil device 45, the bias member 18 releases the first spool 14, and the first spool 14 returns to a top portion of the housing 12. The apparatus 10 includes a face plate 24 including an oversized aperture 34 such that when the head 40 of the cord 20 is disposed therethrough sufficient access space is available to reach in and grasp the head 40 of the cord 20.

Figure 5:
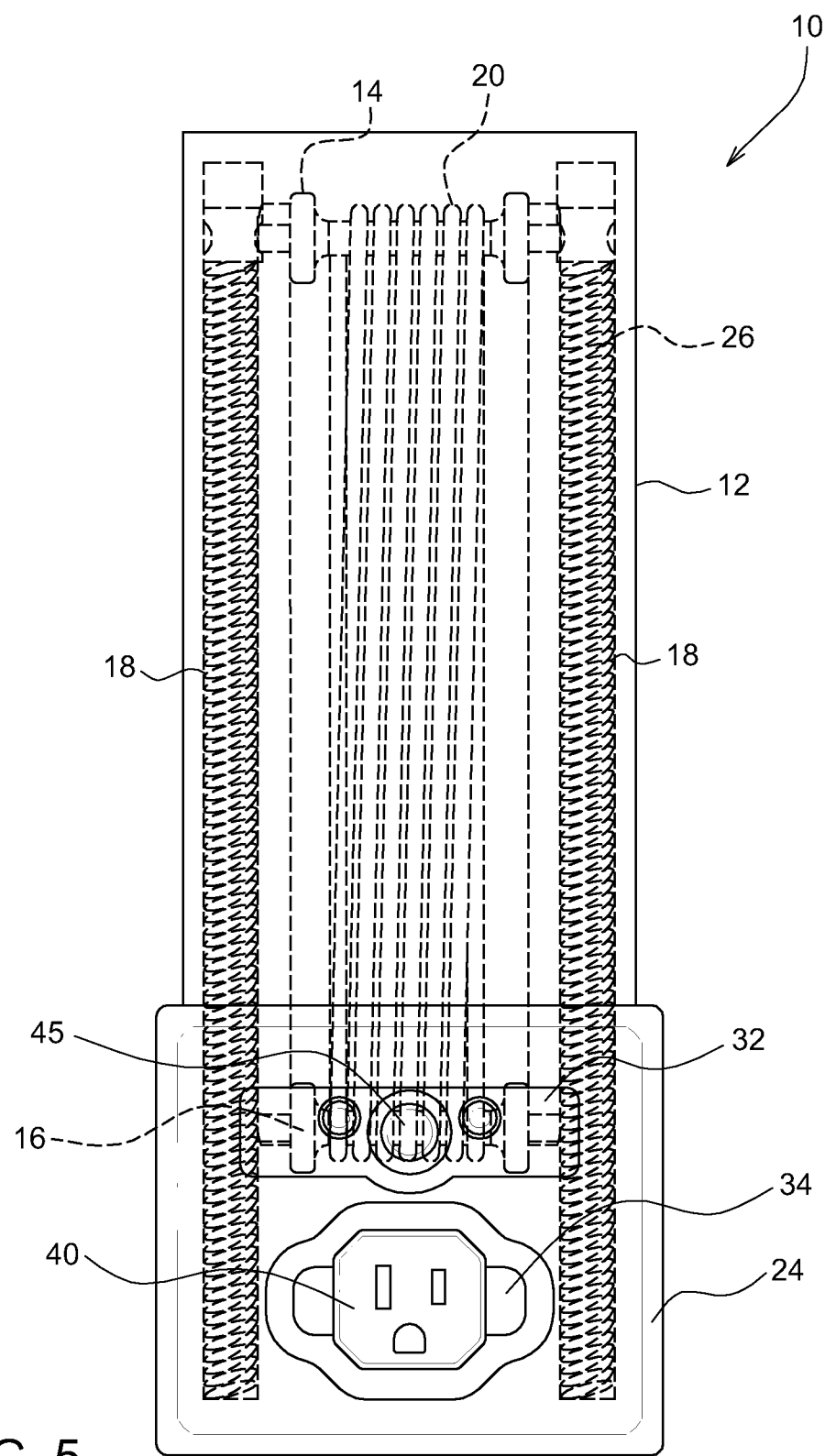
FIG. 5 is a front elevational view of a cord dispensing apparatus, according to one embodiment of the invention.

FIG. 5 is a front elevational view of a cord dispensing apparatus, according to one embodiment of the invention. There is shown a cord dispensing apparatus 10 including a housing 12 having a pair of guide channels 26 therein that are engaged to a first spool 14 that may traverse the guide channels under force. The housing is coupled to a faceplate having a ratcheting mechanism 32 with a recoil device (button) configured to permit selective determination of a ratcheting mode by a user. The faceplate includes an oversized aperture 34 through which the head of a cord extends.

In one embodiment, a cord makes a single or half-winding about a first spool that is coupled to a bias member and engaged with one or more guides that facilitate keeping a spool oriented and positioned in a manner that facilitates repeated effective use. Wherein the guides permit the spool to substantially be moved out of the way of the cord when retracted, the cord may be effectively retracted its entire length, as the winding is effectively temporarily destroyed.

Figure 6:
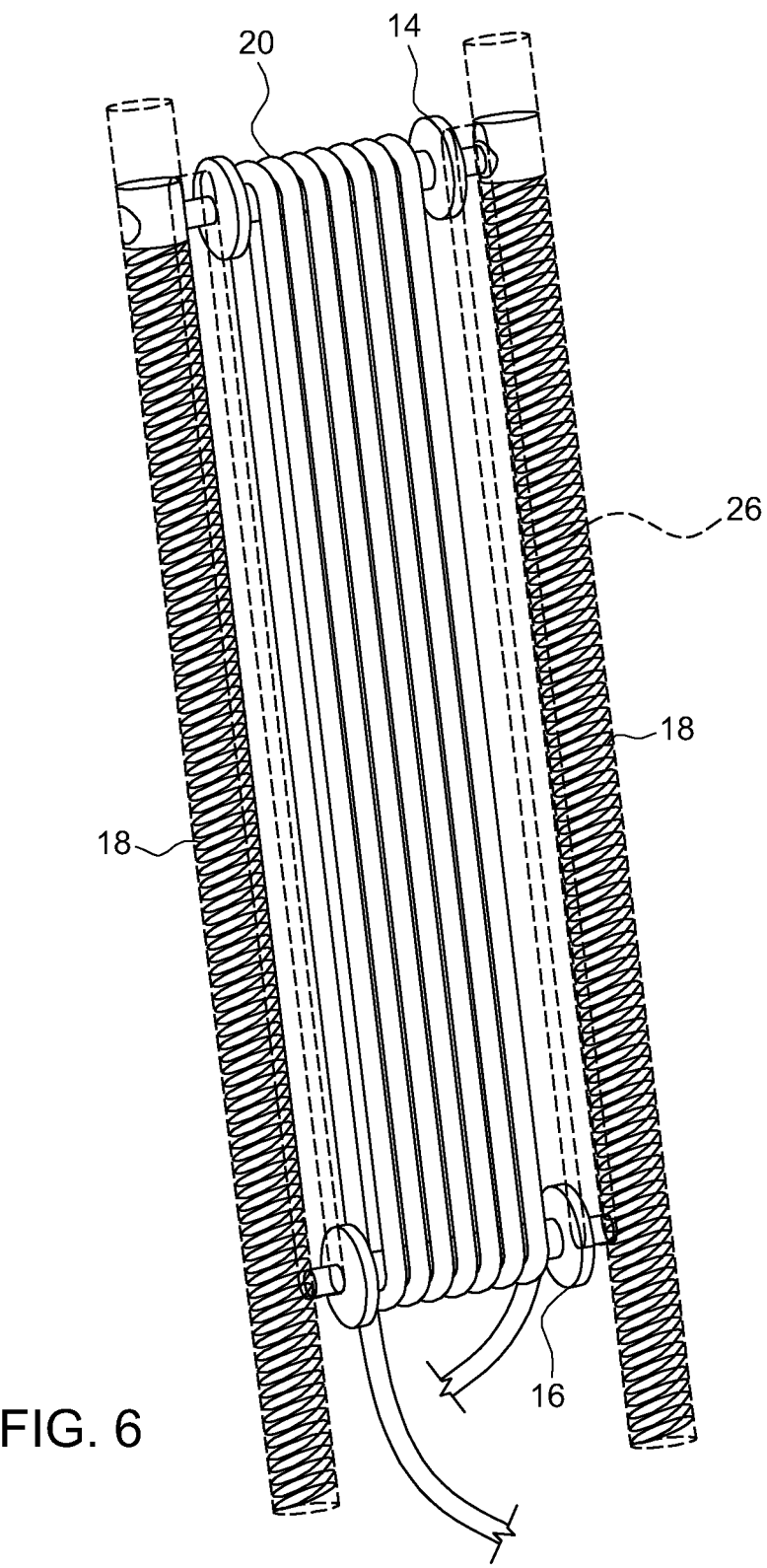
FIG. 6 is a front perspective view of a first spool and a second spool of a cord dispensing apparatus, according to one embodiment of the invention.

FIG. 6 is a front perspective view of a first spool and a second spool of a cord dispensing apparatus with exterior surfaces of the housing not illustrated for clarity, according to one embodiment of the invention. There is shown a first spool and a second spool of a cord dispensing apparatus. The first spool 14 is engaged to a pair of guide channels 26 in a manner that permits the first spool to traverse the guide channels. There is a cord wrapped/wound around the first and second spools. The second spool 16 is fixedly coupled to an interior of the housing such that it does not move relative to the housing. Accordingly, the first spool may be moved closer to the second spool by traversing a portion of the path defined by the guide channels.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

STATEMENTS OF INVENTION

1. A cord dispensing apparatus configured to dispense a length of cord, comprising;
   a) a housing;
   b) a first spool disposed within the housing;
   c) a second spool disposed within the housing and spaced from the first spool;
   d) a bias member coupled to the first spool and positioned and oriented such that the bias member resists displacement of the first spool in the direction of the second spool;
   e) a cord wound between both the first spool and the second spool in a plurality of cross-spool windings, a head of the cord extending outside of the housing; and
   f) a mounting structure coupled to the housing and configured to mount the housing to a surface.
2. The apparatus of statement 1, wherein the bias member is positioned between the first spool and the second spool.
3. The apparatus of statements 1 or 2, wherein the first spool and the second spool are coupled to a pair of guide channels.
4. The apparatus of any preceding statement, wherein the bias member is a spring.
5. The apparatus of any preceding statement wherein at least one of the first spool and the second spool comprises a central shaft and a free spinning exterior surface, wherein the exterior surface of one of the spools is configured to freely rotate.
6. The apparatus of any preceding statement, wherein the housing is L-shaped.
7. The apparatus of any preceding statement, further comprising a ratchet mechanism configured to selectably restrict re-entry of the cord into the housing.
8. The apparatus of any preceding statement, further comprising a face plate provided with an oversized aperture such that, when the head of the cord is disposed therethough, sufficient access space is available to reach in and grasp the head.
9. The apparatus of any preceding statement, further comprising a connection region of the housing provided with a tail portion of the cord and configured to receive a connection to the cord.

For example, although the figures illustrate particular sizing and shapes of specific members, it is understood that embodiments of the invention may be of any size and the number of specific shapes that fit within the claims is plethoric.

Additionally, although the figures illustrate a particular outlet configuration, it is understood that embodiments of the invention may include any number of outlets and/or sockets and that any additional outlets and/or sockets may or may not be configured to extend/retract using the same or similar structure as described herein.

Further, while power outlets of a particular type are illustrated, it is understood that other kinds of cords that carry information and/or materials may be utilized with the structure described herein.

More, while the figures illustrate a upwardly extending housing, it is understood that the housing may extend in any direction and/or in multiple directions.

It is also envisioned that one or more embodiments may be utilized in convention centers, hotels, conference rooms, airports, malls, libraries, colleges, universities, corporate shows, commercial buildings, exterior applications (such as but not limited to patio, lawn, and party), electric cars, government buildings, homes, furniture, industrial settings, post-fab construction, pre-fab construction, apartments, condos, shipping container housing, and the like and combinations thereof.

It is expected that there could be numerous variations of the design of this invention. A non-limiting example is that one or more members (structure, device, system, etc.) described herein may be outfitted with a quick-release hand-operated coupling device (such as but not limited to a spring-loaded button coupled to a connecting structure) such that the member may be released from another member and/or from a wall or other attached surface and thereby removed and/or replaced easily.

Finally, it is envisioned that the components of the device may be constructed of a variety of materials, including but not limited to metals, ceramics, wood, fibers, resins, plastics, composites, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:
1. A cord dispensing apparatus configured to dispense a length of cord, comprising:
   a) an L-shaped housing having an elongated body extending upward and a footing extending orthogonally therefrom;
   (b) first and second channels extending along the elongated body of the housing;
   (c) a first spool having ends disposed within the channels of the elongated body of the housing;
   d) a second spool disposed within the housing and spaced from the first spool;
   (e) a bias member extending along the inside of one of the channels coupled to the first spool and positioned and oriented such that the bias member is guided by the channel and resists displacement of the first spool in the direction of the second spool;
   f) a cord wound between both the first spool and the second spool in a plurality of cross-spool windings, a head of the cord extending outside of the housing; and
   g) a mounting structure coupled to the housing and configured to mount the housing to a surface.
2. The apparatus of claim 1, wherein the bias member is positioned between the first spool and the second spool.
3. The apparatus of claim 1, wherein the bias member is a spring.

4. The apparatus of claim 1, wherein at least one of the first spool and the second spool include a central shaft and a free spinning exterior surface, wherein the exterior surface of one of the spools is configured to freely rotate.

5. The apparatus of claim 1, configured to receive a button activated ratchet mechanism having a wheel that is coupled directly to the cord by friction, wherein the wheel is configured to selectably restrict re-entry of the cord into the housing and to selectably permit re-entry when the button is pressed.

6. The apparatus of claim 1, further comprising a face plate including an oversized aperture such that when the head of the cord is disposed therethrough sufficient access space is available to reach in and grasp the head.

7. The apparatus of claim 1, further comprising a connection region of the housing including a tail portion of the cord and configured to receive a connection to the cord.

8. A cord dispensing apparatus configured to dispense a length of cord, comprising:
   a) a housing;
   (b) first and second channels extending along the housing;
   (c) a first spool having ends disposed within the channels of the housing;
   (d) a second spool disposed within the housing and spaced vertically downward from the first spool;
   (e) a bias member extending along the inside of one of the channels coupled to the first spool and positioned and oriented such that the bias member is guided by the channel and resists displacement of the first spool in the direction of the second spool;
   f) a cord wound between both the first spool and the second spool in a plurality of cross-spool windings, a head of the cord extending outside of the housing;
   g) a mounting structure coupled to the housing and configured to mount the housing to a surface;
   h) a connection region of the housing including a tail portion of the cord and configured to receive a connection to the cord;
   i) a ratchet mechanism configured to selectably restrict re-entry of the cord into the housing; and
   (j) a face place disposed near the second spool and including an oversized aperture such that when the head of the cord is disposed therethrough sufficient access space is available to reach in and grasp the head.

9. The apparatus of claim 8, wherein the bias member is positioned between the first spool and the second spool.

10. The apparatus of claim 9, wherein the bias member is a spring.

11. The apparatus of claim 10, wherein at least one of the first spool and the second spool include a central shaft and a free spinning exterior surface, wherein the exterior surface of one of the spools is configured to freely rotate.

12. The apparatus of claim 11, wherein the housing is L-shaped.

13. A cord dispensing apparatus configured to dispense a length of cord, comprising:
   a) a housing; wherein the housing is L-shaped, including an upwardly extending elongated portion;
   (b) first and second channels extending along the housing;
   (c) a first spool disposed within a top of the upwardly extending elongated portion of the housing;
   (d) a second spool disposed within the housing and spaced from the first spool; wherein the first spool is coupled to the channels; wherein at least one of the first spool and the second spool include a central shaft and free spinning exterior surface, wherein the exterior surface of one of the spools is configured to freely rotate;
   (e) a bias member extending along the inside of one of the channels coupled to the first spool and positioned and oriented such that the bias member is guided by the channel and resists displacement of the first spool in the direction of the second spool; wherein the bias member is positioned between the first spool and the second spool; wherein the bias member is a spring;
   f) a cord wound between both the first spool and the second spool in a plurality of cross-spool windings, a head of the cord extending outside of the housing;
   g) a mounting structure coupled to the housing and configured to mount the housing to a surface;
   h) a connection region of the housing including a tail portion of the cord and configured to receive a connection to the cord;
   i) a ratchet mechanism configured to selectably restrict re-entry of the cord into the housing; and
   j) a face plate including an oversized aperture such that when the head of the cord is disposed therethrough sufficient access space is available to reach in and grasp the head.

\* \* \* \* \*